United States Patent Office 3,013,006
Patented Dec. 12, 1961

3,013,006
WATER-INSOLUBLE AZOPHTHALOCYANINE DYESTUFFS AND PROCESS FOR THEIR PRODUCTION
Berthold Bienert, deceased, late of Leverkusen-Bayerwerk, Germany, by Hildegard Bienert, Leverkusen-Bayerwerk, Germany, Hildegard Dorothea Prochaska, Rock Hill, S.C., and Berthold Klaus Bienert, Leverkusen-Bayerwerk, Germany, heirs, and Kurt Breig and Manfred Groll, Koln-Stammheim, Germany, assignors to Farbenfabriken Bayer Aktiengesellschaft, Leverkusen, Germany, a corporation of Germany
No Drawing. Filed Sept. 4, 1959, Ser. No. 838,049
Claims priority, application Germany Oct. 11, 1955
7 Claims. (Cl. 260—147)

The present invention relates to new water-insoluble azophthalocyanine dyestuffs and to a process for their manufacture; more particularly it relates to azophthalocyanine dyestuffs corresponding to the formula

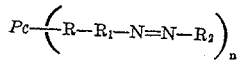

In the general formula Pc stands for a phthalocyanine radical, R means a $-SO_2-$ or $-CO-$ group, $R_1$ an amino-group-containing organic radical selected from the group consisting of aminophenyl-pyrazolone, aminobenzoyl-acetic-acid - anilide, acetoacetic - acid-(aminophenyl)-amide, 2-hydroxynaphthalene-3-carboxylic acid-(aminophenyl)-amide and aminohydroxynaphthalene series; the organic radical is linked to the radical R via the amino group and contains the azo bridge in o-position to the enolic or phenolic hydroxyl group, $R_2$ stands for a radical of a diazo compound, the azophthalocyanine dyestuffs being free of sulfonic acid and carboxylic acid groups, and $n$ is a number from 1 to 4.

In accordance with the invention is has been found that valuable water-insoluble azophthalocyanine dyestuffs can be obtained by coupling in substance or on the fibre diazo compounds which are free of sulfonic acid or carboxylic acid groups, with phthalocyanine-sulfonamides and -carbonamides corresponding to the formula

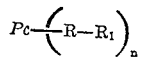

wherein Pc, R, $R_1$ and $n$ have the meaning as previously defined. In this formula, the radicals Pc and $R_1$ are also free of sulfonic and carboxylic acid groups.

The phthalocyanine-acidamides used as coupling components according to the process of the invention are obtainable by reacting phthalocyanine-sulfonic acid halides or phthalocyanine-carboxylic acid halides with primary or secondary amines capable of coupling and being free of sulfonic acid and carboxylic acid groups. For this purpose, metal-free phthalocyanines can be employed as well as those containing metals, for example copper, nickel or cobalt. The acid halide groups may be located in the benzene nuclei of the macrocyclic phthalocyanine ring, in annelated aromatic nuclei or in aryl radicals which are linked to the macrocyclic ring, either directly or via bridging groups such as $-CO-$, $-SO_2-$, or $-NH-$. Among the acid halides the acid chlorides are of special interest.

As amines which are capable of undergoing coupling and which are suitable for reaction with phthalocyanine-sulfonic acid halides or phthalocyanine carboxylic-acid halides there may be mentioned for example, aminophenyl-pyrazolones such as 3-, or 4-aminophenyl-3-methyl-5-pyrazolone, aminoacylacetic acid arylamines and acylacetic acid aminoarylamines such as 3-, or 4-amino-benzoyl-acetanilide, aceto acetic (4'-aminophenyl)-amide, aceto acetic (2' - methoxy - 4'-amino - 5'-chlorophenyl)-amide, aminohydroxy-naphthalenes such as 1-amino-7-hydroxy - naphthalene, 2 - amino-8 - hydroxy-naphthalene; amino-hydroxybenzenes, and amino group-containing hydroxy-naphthalene carboxylic acid arylides.

Reaction between the phthalocyanine-sulfonic acid halide or phthalocyanine-carboxylic acid halide with the amine capable of coupling is preferably carried out in an organic medium, for example in chlorobenzene, nitrobenzene, alcohols, or dimethyl formamide, to prevent hydrolysis of the acid halide groups. If only a part of the total acid halide groups reacts, the remaining groups can then be reacted, in the usual manner, with ammonia or with non-coupling amines. Apart from the sulfonamide groups, the phthalocyanine radicals may contain other substituents such as halogen, alkyl, alkoxy-, or acylamino groups.

According to the invention, the phthalocyanine-sulfonamides are coupled in substance or on the fibre with diazo components being free of sulfonic acid and carboxylic acid groups. In this process diazo components of the same structure or mixtures of different diazo compounds may be applied. Coupling is carried out in usual manner in acid, neutral, or alkaline medium, according to the nature of the substituents.

The diazo-component may also be used in a stabilized form, for example as diazo-aryl-zinc chloride salts or as diazoamino-compounds. For printing on textiles, certain diazoamino compounds are particularly suitable which are prepared from diazotized amines which do not contain sulfonic acid or carboxylic acid groups, and secondary amines (stabilizers) of the aliphatic, aromatic, or heterocyclic series. These compounds include, for example, compounds made from weakly negatively substituted amines of the benzene series and 2-alkylamino-5(4)-sulfobenzoic acids which yield when printed together with coupling phthalocyanine-sulfonamides of the above-mentioned kind and developed with neutral or acid steam on cellulose fibres strong and clear prints of good fastness properties.

The new dyes usually impart green shades to vegetable fibres, which distinguish themselves by excellent fastness properties. The dyes which are prepared in substance are valuable pigment dyes which can be applied for the coloration of lacquers, resins, plastic masses, and others.

The following examples are given for the purpose of illustrating the invention without, however, limiting it thereto; the parts by weight and the parts by volume stand in the ratio of grams to millilitres.

*Example 1*

27 parts by weight of 1-(4'-aminophenyl)-3-methyl-pyrazolone-(5) are stirred into 22 parts by weight of dimethylformamide and 18.5 parts by weight of methanol. 17.4 parts by weight of Cu-phthalocyanine-(3)-trisulfochloride are added at 15–20° C. and the reaction mixture is stirred at 25° C. for about 34–36 hours until the reaction is complete. The melt is then stirred into 120 parts by weight of methanol and the reaction product is filtered off by suction, washed with 35 parts by weight of methanol, stirred with 250 parts by weight of water and 50 parts by weight of hydrochloric acid at 60° C., filtered off by suction, washed neutral, and dried. The reaction product which is obtained in very good yield is readily soluble in sodium hydroxide solution.

The coupling component prepared by this method can be employed for the production of a green print according to the following procedure: The coupling component is mixed in an amount equivalent to its coupling power with the diazoamino compound prepared from diazotized 1-amino-2-methyl-4,5-dichlorobenzene and 2-ethylamino-5-sulfobenzoic acid. 60 parts by weight of this mixture are stirred with 100 parts by volume of a diluted sodium hydroxide solution (concentrated caustic soda at 38° Bé diluted in the proportion 1:10). This solution is stirred into a mixture comprising 500 parts by weight of starch-tragacanth thickening and 240 parts by volume of water. This printing paste when developed by neutral or acid steaming yields on cotton or regenerated cellulose a green print.

If the diazo-components listed in the following table are employed instead of the 1-amino-2-methyl-4,5-dichloro-benzene and if the above-mentioned directions are followed in other respects, valuable prints are obtained on cotton material.

| Diazo component | Coupling component prepared from— | Shade |
|---|---|---|
| 4-chloro-5-bromo-2-toluidine | Cu-phthalocyanine-(3)-trisulfochloride and 1-(4'-amino-phenyl)-3-methyl-pyrazolone-(5). | bright green. |
| 2,5-dichloroaniline | do | Do. |
| o,o'-dichlorobenzidine | do | olive green. |
| 1-amino-anthraquinone | do | covered green. |
| 1-methoxy-2-aminobenzene-4-carboxylic acid amide. | do | bright green. |
| 4-methyl-5-benzoylamino-2-anisidine. | do | brownish olive. |
| 4'-amino-4-methoxydiphenylamine. | do | bluish violet. |
| 4-nitro-2-anisidine | do | yellowish bright green. |
| 5-nitro-4-cresidine | do | Do. |
| 5-chloro-2-toluidine | do | bright green. |
| 5-nitro-2-toluidine | do | bright yellowish green. |
| 4-chloro-2-anisidine | do | covered green. |
| 4,5-dichloro-2-anisidine | do | bright green. |
| p-toluidine | do | Do. |
| 4-chloro-2-toluidine | do | Do. |
| 2-anisidine-4-sulfodiethylamide. | do | Do. |
| 2-toluidine-4-sulfodimethylamide. | do | Do. |
| 5-nitro-2-anisidine | do | covered yellowish green. |
| 4-chloro-5-benzoylamino-2-toluidine. | do | covered green. |
| 1-amino-2-chloro-4-trifluoromethylbenzene. | do | bluish green. |
| 3,5-bis-trifluoromethyl-aniline. | do | bluish bright green. |
| 3-chloroaniline | do | bright green. |
| 2-chloro-4-benzoylamino-5-methoxy-aniline. | do | olive green. |
| 2,5-dichloro-4-aminoaniline | do | greenish brown. |
| 3,3'-dimethoxybenzidine | do | bright brown. |
| 2-amino-5-benzoylamino-1,4-hydroquinone-diethyl-ether. | do | bluish brown. |

If 1-(3'-aminophenyl)-3-methyl-pyrazolone-(5) is employed in place of 1-(4'-aminophenyl)-3-methyl-pyrazolone-(5), similar dyeings of good properties can be obtained.

When Cu-phthalocyanine-(3)-trisulfochloride is replaced by Ni-phthalocyanine-(3)-trisulfochloride, similar results are obtained. For instance, when a coupling component is formed from Ni-phthalocyanine-(3)-trisulfochloride and 1-(4'-aminophenyl)-3-methyl-pyrazolone-(5) and then coupled with diazotized 2,5-dichloro-aniline, a product having the following structural formula is obtained:

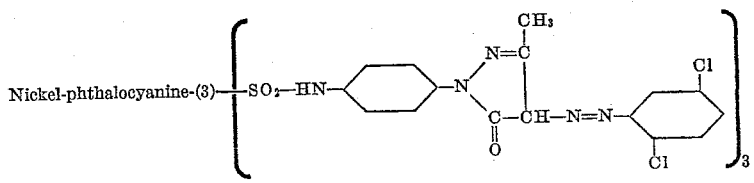

When the same coupling component is combined with 3-chloro-aniline the product has the following structural formula:

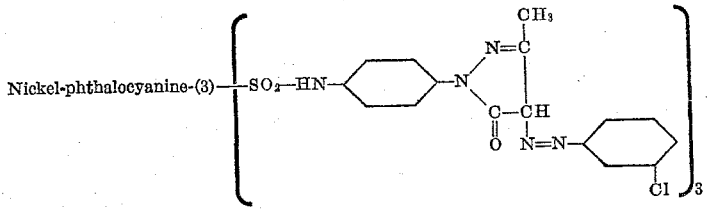

Example 2

With a coupling component prepared in dimethylformamide from 13 parts by weight of 1-(4'-aminophenyl)-3-methyl-pyrazolone-(5) and 17.4 parts by weight of Cu-phthalocyanine-(3)-trisulfochloride there is obtained according to the method described in Example 1 with an equivalent amount of the diazoamino compound prepared from diazotized 4-chloro-2-toluidine and 2-ethylamino-5-sulfobenzoic acid, a bright green print on cotton material having good fastness properties.

The above-mentioned coupling component can be prepared according to the following procedure:

13 parts by weight of 1-(4'-aminophenyl)-3-methyl pyrazolone-(5) are stirred into 22 parts by weight of dimethyl formamide and 18.5 parts by weight of methanol. 17.4 parts by weight of Cu-phthalocyanine-(3)-trisulfochloride are added at 15–20° C. and the reaction mixture is stirred at 25° C. According to the progress of the reaction, 6 parts by weight of anhydrous sodium carbonate are slowly added, and stirring is continued for 24–36 hours until the reaction is complete. After addition of a little hydrochloric acid, the mixture is worked up as in Example 1.

Dyeings of similar properties are obtained on replacement of the 1-(4'-aminophenyl)-3-methyl-pyrazolone-(5) by the corresponding 3'-aminophenyl-derivative, or if using instead of Cu-phthalocyanine-(3)-trisulfochloride the corresponding Ni-phthalocyanine-(3)-trisulfochloride. When a coupling component is formed from Ni-phthalocyanine-(3)-trisulfochloride and 1-(4'-aminophenyl)-3-methyl-pyrazolone-(5) and then coupled with diazotized 4-chloro-2-toluidine as in the first paragraph of this example, the compound has the following structural formula:

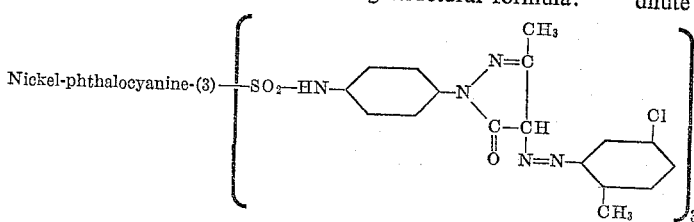

Example 3

34 parts by weight of 1-(3'-aminophenyl)-3-methyl-pyrazolone-(5) are stirred into 42 parts by weight of dimethyl formamide and 35 parts by weight of methanol. 19.4 parts by weight of Ni-phthalocyanine-(3)-tetrasulfochloride are added at 15–20° C. and the reaction mixture is stirred at 25° C. for about 40–50 hours until the reaction is complete. The melt is then poured into 150 parts by weight of methanol to precipitate the reaction product which is filtered off by suction, washed with methanol, stirred with 250 parts by weight of water and 50 parts by weight of hydrochloric acid at 60° C., filtered off by suction and washed neutral. The reaction product is obtained in very good yield as a turquoise powder, and is very readily soluble in sodium hydroxide solution.

When this coupling product is employed according to the method given in Example 1 with the equivalent amount of the diazoamino compound prepared from diazotized 4,5-dichloro-2-toluidine and 2-ethylamino-5-sulfobenzoic acid, a bright green shade of good fastness properties is obtained.

If the diazo-component is replaced in this example, by 2,5-dichloroanilidine, or in the azo-component 1-(3'-amino-phenyl)-3-methyl-pyrazolone-(5) by the corresponding 4'-amino-derivative, or the Ni-phthalocyanine-(3)-tetrasulfochloride by the corresponding copper-containing phthalocyanine, similar green prints are obtained on cotton. If the coupling component is prepared from Ni - phthalocyanine - (3) - tetrasulfochloride and 1 - (3'-aminophenyl)-3-methyl-pyrazolone-(5) and then coupled with diazotized 2,5-dichloroaniline, a compound having the following structural formula is obtained:

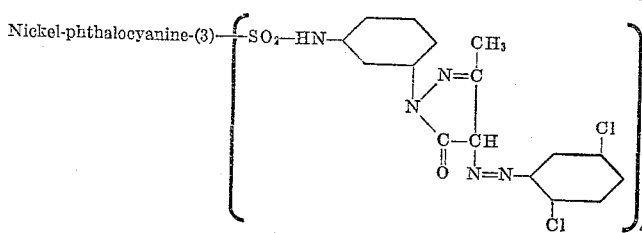

Example 4

When the coupling component prepared in methanol/dimethyl formamide from 17.4 parts by weight of Cu-phthalocyanine-(3)-trisulfochloride and 34 parts by weight of 3-aminobenzoylacetic acid-anilide is employed according to the method given in Example 1 with the equivalent amount of the diazoamino-compound prepared from diazotized 4,5-dichloro-2-toluidine and 2-ethylamino-5-sulfobenzoic acid bright bluish green shades are obtained.

Example 5

17.4 parts by weight of Cu-phthalocyanine-(3)-trisulfochloride are stirred into 22 parts by weight of dimethylformamide and 18 parts by weight of methanol. 7 parts by weight of methanol which contain 1.8 parts by weight of dimethylamine in solution are then added at 15–20° C. The mixture is stirred at 15–20° C. for 1 hour. 18 parts by weight of 1-(4'-aminophenyl)-3-methylpyrazolone-(5) are then added, and the mixture is maintained at 25° C. until the reaction is complete. The product is worked up by stirring the melt into methanol, and the reaction product is filtered off by suction and stirred with dilute hydrochloric acid as described in Example 1.

With the coupling component thus obtained there is produced according to the printing directions given in Example 1 by use of the equivalent amount of the diazoamino compound prepared from diazotized 4,5-dichloro-2-toluidine and 2-ethylamino-5-sulfobenzoic acid, a covered green print on cotton.

In this example, a similar result can be obtained if instead of 1-(4'-aminophenyl)-3-methyl-pyrazolone-(5) the equivalent amount of 1-(3'-aminophenyl)-3-methyl-pyrazolone-(5) is employed.

Methylamine can be used instead of dimethylamine with similar results. If the Cu-phthalocyanine-(3)-trisulfochloride is replaced by the corresponding Ni-derivative dyestuffs and dyeings of similar properties are obtained.

Example 6

With a coupling component obtained from 33 parts by weight of aceto acetic acid-(2'-methoxy-4'-amino-5'-chlorophenyl)-amide and 17.4 parts by weight of Ni-phthalocyanine-(3)-trisulfochloride, and the equivalent amount of a diazoamino compound from diazotized 2,5-dichloroaniline and 2-ethylamino-5-sulfobenzoic acid, a blue-tinted bright green is obtained on cotton according to the method given in Example 1.

The coupling component employed in this example may be prepared according to the following procedure:

33 parts by weight of aceto-acetic-acid-(2'-methoxy-4'-amino-5'-chlorophenyl)-amide are stirred into 22 parts by weight of dimethylformamide and 19 parts by weight of methanol. 17.4 parts by weight of Ni-phthalocyanine-(3)-trisulfochloride are added with stirring at 15–20° C., and the mixture is stirred at 25° C. for 50–60 hours. The melt is then added to 150 parts by weight of methanol, and the reaction product is filtered off by suction, washed with methanol, purified by stirring up with 250 parts by weight of water and 50 parts by weight of hydrochloric acid at 60° C., filtered off by suction, and washed neutral. The turquoise blue powder which is obtained in very good yield dissolves in dilute sodium hydroxide solution.

Similar coupling components can be obtained if used instead of Ni-phthalocyanine-(3)-trisulfochloride the corresponding Cu-derivative.

The aceto-acetic-acid-(2'-methoxy-4'-amino-5'-chlorophenyl)-amide employed in this example may be replaced by aceto-acetic-acid(4'-aminophenyl)-amide. In that event, dyeings of similar properties are obtained.

Example 7

34 parts by weight of 1-(4'-aminophenyl)-3-methyl-pyrazolone-(5) are stirred into 22 parts by weight of dimethyl formamide and 18.5 parts by weight of methanol. 19.4 parts by weight of Cu-phthalocyanine-(4)-tetrasulfochloride are added at 15–20° C. After stirring at 25°

C. for some 30 hours, the melt is poured into 150 parts by weight of methanol, and the product is filtered off by suction and briefly washed with methanol. The product thus obtained is stirred up with 250 parts by weight of water and 50 parts by weight of hydrochloric acid at 60° C., filtered off by suction, and washed neutral.

According to the method given in Example 1, there is obtained with the diazoamino-compound prepared from diazotized 4,5-dichloro-2-toluidine and 2-ethylamino-5-sulfobenzoic acid and equivalent amount of the above indicated coupling component, a bright green print on cotton material.

In this example, Ni-phthalocyanine-(4)-tetrasulfochloride or Co-phthalocyanine-(4)-tetrasulfochloride may be employed in a similar manner to replace the copper-containing phthalocyanine.

Example 8

With an azo-component obtainable from 17.4 parts by weight of Cu-phthalocyanine-(3)-trisulfochloride, 2.8 parts by weight of m-nitraniline, and 18 parts by weight of 1-(4'-aminophenyl)-3-methyl-5-pyrazolone there can be produced according to the method given in Example 1 with the equivalent amount of a diazoamino-compound from diazotized 4,5-dichloro-2-toluidine and 2-ethylamino-5-sulfobenzoic acid, a green print.

The coupling component is obtainable by the following procedure:

17.4 parts by weight of Cu-phthalocyanine-(3)-trisulfochloride are stirred into 22 parts by weight of dimethyl formamide and 19 parts by weight of methanol at 15° C. 2.8 parts by weight of m-nitraniline are then added at 20–25° C., and the mixture is stirred for 2 hours. Then 4 parts by weight, and after a further 3 hours, another 18 parts by weight of 1-(4'-aminophenyl)-3-methyl-pyrazolone-(5) are added, and the reaction mixture is again stirred at 25° C. for 30 hours. The product is worked up with methanol and hydrochloric acid as described in Example 1.

Similar results can be obtained by replacing the m-nitraniline by p- or o-nitraniline.

Example 9

22.5 parts by weight of diphenyl-Cu-phthalocyanine-tetrasulfochloride (obtained by treatment of diphenyl-Cu-phthalocyanine with chlorosulfonic acid at 140° C. and subsequently with thionyl chloride at 90° C.) are stirred into 35 parts by weight of dimethyl formamide and 30 parts by weight of methanol, at 15° C. After cooling to 5° C., 12 parts by weight of methanol containing 2.4 parts by weight of methylamine in solution are added during ½ hour. The mixture is stirred for 2 hours at 8 to 10° C.; then 18 parts by weight of 1-(4'-aminophenyl)-3-methyl-pyrazolone-(5) are added at 15–20° C., and reacted at 25° C. for 30 hours. The product is worked up with methanol and dilute hydrochloric acid as described in Example 1. The bluish green powder which is obtained in very good yield dissolves in dilute sodium hydroxide solution.

With this coupling component there is obtained according to the printing directions given in Example 1 with the equivalent amount of a diazoamino-compound prepared from diazotized 4,5-dichloro-2-toluidine and 2-ethylamino-5-sulfobenzoic acid, a green shade on cotton material.

A similar result can be obtained by using instead of 1-(4'-aminophenyl)-3-methyl-pyrazolone-(5) the 1-(3'-aminophenyl)-derivative.

Example 10

A coupling component obtainable in dimethyl formamide/methanol from 26 parts by weight of 1-amino-7-hydroxy-naphthalene and 17.4 parts by weight of Ni-phthalocyanine-(3)-trisulfochloride is printed with the equivalent amount of a diazoamino-compound prepared from diazotized 4,5-dichloro-2-toluidine and 2-ethylamino-5-sulfobenzoic acid according to the directions given in Example 1 on cotton. A blue print is obtained.

Example 11

With a coupling component prepared in dimethyl formamide/methanol from 39 parts by weight of 2-hydroxy-naphthalene - 3 - carboxylic acid-(3'-aminophenyl)-amide and 17.4 parts by weight of Cu-phthalocyanine-(3)-trisulfochloride, and the equivalent amount of a diazoamino-compound prepared from diazotized 2-amino-5-benzoyl-amino-1,4-diethoxybenzene and 2-ethylamino - 5 - sulfobenzoic acid there is obtained according to the method given Example 1 a bright blue print.

Example 12

17.4 parts by weight of Cu-phthalocyanine-(3)-trisulfochloride are stirred at 15° C. into 30 parts by weight of dimethyl formamide and 30 parts by weight of methanol. 6.2 parts by weight of 4-amino-4'-nitro-diphenyl-amine-2'-sulfonamide are added and the temperature is maintained at 20–25° C. for 2 hours. Then, 4 parts by weight, and after a further 2 hours, another 16 parts by weight of 1-(4'-aminophenyl)-3-methyl-pyrazolone-(5) are added. After 30 hours, the melt is poured into 150 parts by weight of methanol; the reaction product is filtered off by suction, briefly washed with methanol, and purified by stirring with 600 parts by weight of water and 60 parts by weight of hydrochloric acid at 90–95° C. filtered off by suction, and washed neutral. A bluish green powder is obtained in very good yield which dissolves in dilute sodium hydroxide solution with a green coloration.

With the coupling component obtained in this way there can be produced according to the method given in Example 1 with the equivalent amount of the diazoamino compound from diazotized 4,5-dichloro-2-toluidine and 2-ethylamino-5-sulfobenzoic acid a bright green shade on cotton.

Similar results can be obtained in this example by replacing the Cu-phthalocyanine-(3)-trisulfochloride by the corresponding Ni-derivative. Good results can also be obtained by using instead of 4-amino-4'-nitrodiphenyl-amine-2'-sulfonamide the corresponding methyl sulfonamide or dimethyl sulfonamide.

Example 13

A coupling component prepared in dimethylformamide/methanol from 13 parts by weight of 1-(3'-aminophenyl)-3-methyl-pyrazolone-(5) and 17.4 parts by weight of Ni-phthalocyanine-(3)-trisulfochloride is treated according to the method given in Example 1 with the equivalent amount of a diazoamino compound from diazotized 4,5-dichloro-2-toluidine and 2-ethylamino-5-sulfobenzoic acid for the printing on cotton material. A green shade is obtained.

Example 14

19.4 parts by weight of Ni-phthalocyanine-(3)-tetrasulfochloride and 16 parts by weight of 1-(3'-aminophenyl)-3-methyl-pyrazolone-(5) are stirred into 33 parts by weight of dimethylformamide and 30 parts by weight of methanol. If reacted for 14 hours at 25° C., 21 parts by weight of aceto-acetic-acid-(2'-methoxy-4'-amino-5'-chlorophenyl)-amide are added, and stirring is continued at 25–30° C. for another 30 hours. The melt is then added to methanol, the product obtained filtered off by suction, briefly washed with methanol, and purified by stirring with 600 parts by weight of water and 60 parts by weight of hydrochloric acid at 90–95° C., filtered off by suction, and washed until neutral.

If this coupling component is used according to the printing directions given in Example 1 with a diazoamino compound obtained from diazotized 4,5-dichloro-2-toluidine and 2-ethylamino-5-sulfobenzoic acid, a green print is obtained on cotton.

Similar results are obtained by replacing the aceto-acetic-acid derivative specified by the equivalent amount of 3'-aminobenzoyl-acetic-acidanilide.

Example 15

A cotton fabric is printed with the printing paste described below by machine, screen, or block printing methods, dried, passed through a developing bath containing one of the diazo-compounds mentioned in the previous examples or a dye-salt thereof. After squeezing, the dyed fabric is passed through a rinsing bath and then drawn through a hot bath containing 15 parts by volume of sodium bisulfite at 38° Bé. per litre. Rinsing and hot soaping follows. A bright green print is obtained. By printing of various naphthols side-by-side a multi-color effect is attained.

Composition of the printing paste:
20 parts by weight of a phthalocyanine coupling component according to one of the previous examples
30 parts by weight of monopol brilliant oil
50 parts by weight of alcohol
25 parts by weight of sodium hydroxide (38° Bé.)
375 parts by weight of water
500 parts by weight of starch-tragacanth thickening 1000 parts by weight

Example 16

0.1 mol of 2,5-dichloroaniline is diazotized in usual manner with 32.5 parts by volume hydrochloric acid (34% by volume) and 6.9 parts by weight of sodium nitrite, and purified by the addition of filtering charcoal. 0.1 mol of the condensation product prepared from 1 mol of Cu-phthalocyanine-(3)-trisulfochloride and 3,2 mols of 1-(4'-aminophenyl)-3-methyl-pyrazolone-(5) are dissolved in water with the addition of a little sodium hydroxide. After the above-specified diazo-solution is run in, the mixture is slowly heated to 40° C. The coupling is completed after a short time, and the dyestuff can be filtered off by suction. A green pigment dyestuff is obtained which is very fast to solvents.

Example 17

36 parts by weight of 1-(4'-methylaminophenyl)-3-methyl-pyrazolone-(5) are stirred into 27 parts by weight of dimethylformamide and 18.5 parts by weight of methanol. 19.4 parts by weight of Ni-phthalocyanine-(3)-tetrasulfochloride are added at 5–10° C. and the mixture is stirred at 10–20° C. until the reaction is complete. The melt is then stirred into 120 parts by weight of methanol, the product filtered off by suction, stirred with diluted hydrochloric acid at 60° C., filtered off by suction and washed neutral.

With the coupling component thus obtained can be produced according to the method described in Example 1 with the equivalent amount of a diazoamino compound prepared from diazotized 4,5-dichloro-2-toluidine and 2-ethylamino-5-sulfobenzoic acid a bright green shade on cotton having good fastness properties. The dyestuff corresponds to the following structural formula:

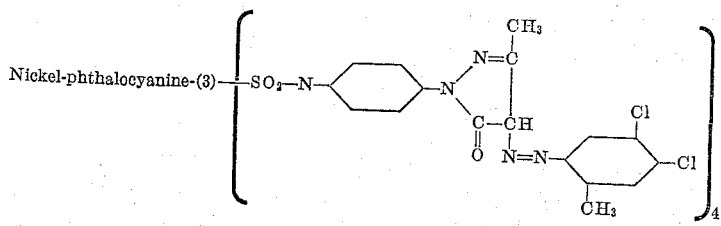

This application is a continuation-in-part application of copending application Serial No. 614,789, filed October 9, 1956, now abandoned.

We claim:

1. An azo-phthalocyanine dyestuff corresponding to the formula

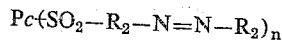

wherein Pc stands for a phthalocyanine radical, $R_1$ stands for a member selected from the group consisting of amino-phenyl-pyrazolone, amino benzoyl acetic acid anilide, aceto acetic acid-(aminophenyl)-amide, 2-hydroxy-naphthalene-3-carboxylic acid-(aminophenyl)-amide and amino-hydroxynaphthalene radicals, $R_1$ being linked to $-SO_2-$ via the amino group, $R_2$ means a radical of a diazo compound, and the azo-phthalocyanine dyestuff being free of sulfonic acid and carboxylic acid groups and $n$ means a number from 1 to 4.

2. The azo-phthalocyanine dyestuff corresponding to the formula

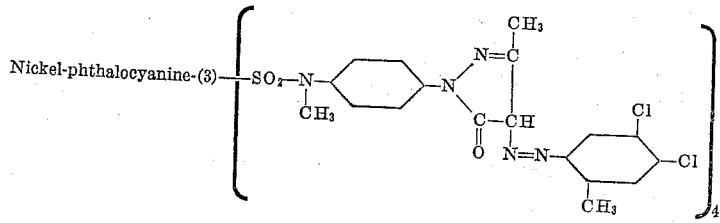

3. The azo-phthalocyanine dyestuff corresponding to the formula

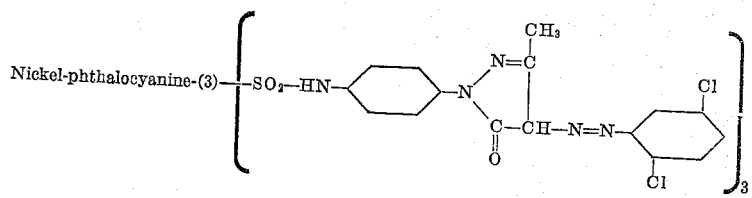

4. The azo-phthalocyanine dyestuff corresponding to the formula

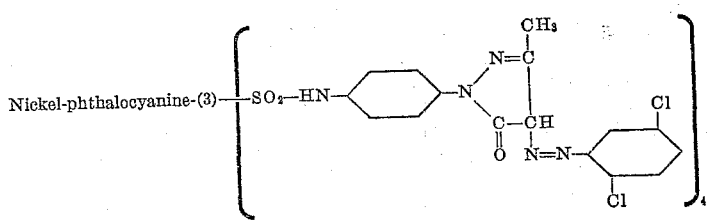

5. The azo phthalocyanine dyestuff corresponding to the formula

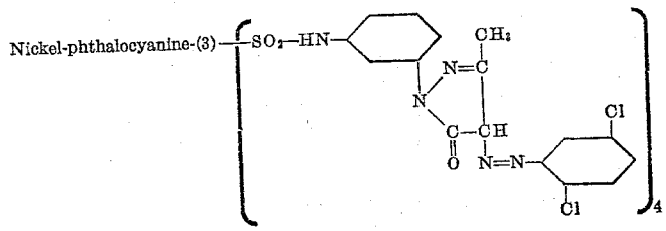

6. The azo phthalocyanine dyestuff corresponding to the formula

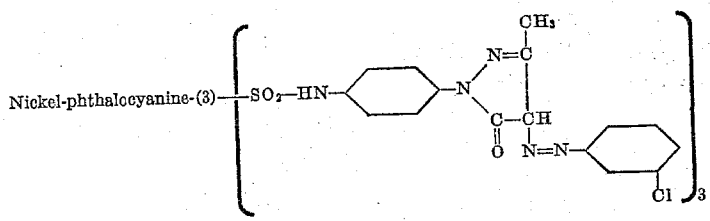

7. An azo-phthalocyanine dyestuff of claim 1 wherein Pc is a nickel phthalocyanine radical, $R_1$ is a member of the amino-phenyl-pyrazolone series and $R_2$ is a diazo component of the benzene series.

References Cited in the file of this patent

UNITED STATES PATENTS

| | | |
|---|---|---|
| 2,339,739 | Blackshaw et al. | Jan. 18, 1944 |
| 2,351,118 | Haddock | June 13, 1944 |
| 2,351,119 | Haddock | June 13, 1944 |
| 2,459,771 | Fox | Jan. 18, 1949 |
| 2,776,957 | Brentano | Jan. 8, 1957 |

UNITED STATES PATENT OFFICE
CERTIFICATION OF CORRECTION

Patent No. 3,013,006            December 12, 1961

Berthold Bienert et al.

It is hereby certified that error appears in the above numbered patent requiring correction and that the said Letters Patent should read as corrected below.

Column 10, lines 22 to 32, the formula should appear as shown below instead of as in the patent:

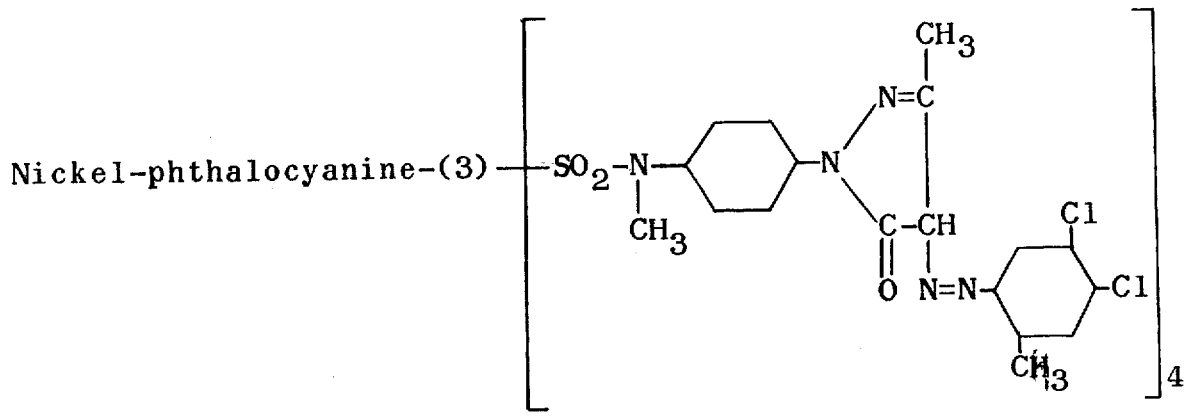

same column 10, line 39, the formula should appear as shown below instead of as in the patent:

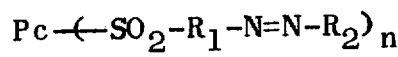

Signed and sealed this 19th day of June 1962.

(SEAL)

Attest:

ERNEST W. SWIDER
Attesting Officer

DAVID L. LADD
Commissioner of Patents